(12) United States Patent
Woodward, Jr. et al.

(10) Patent No.: US 8,214,422 B1
(45) Date of Patent: Jul. 3, 2012

(54) METHODS AND APPARATUS FOR SENDING CONTENT BETWEEN CLIENT DEVICES

(75) Inventors: Donald R. Woodward, Jr., San Mateo, CA (US); Alain Regnier, Sunnyvale, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 846 days.

(21) Appl. No.: 10/124,583

(22) Filed: Apr. 16, 2002
(Under 37 CFR 1.47)

Related U.S. Application Data

(60) Provisional application No. 60/313,557, filed on Aug. 19, 2001.

(51) Int. Cl.
*G06F 15/16* (2006.01)

(52) U.S. Cl. ........ 709/201; 709/203; 709/238; 709/249; 725/37; 725/46; 725/31; 725/38; 711/100; 711/200

(58) Field of Classification Search .................. 709/217, 709/226, 231, 238, 243, 201, 203, 249; 707/201; 711/202, 100, 200; 725/37, 46, 38, 31
See application file for complete search history.

(56) References Cited

U.S. PATENT DOCUMENTS

| | | | |
|---|---|---|---|
| 5,333,091 A | 7/1994 | Iggulden et al. | 360/14.1 |
| 5,455,630 A | 10/1995 | McFarland et al. | 348/476 |
| 5,600,366 A | 2/1997 | Schulman | |
| 5,652,615 A | 7/1997 | Bryant et al. | |
| 5,661,516 A | 8/1997 | Carles | |
| 5,664,948 A | 9/1997 | Dimitriadis et al. | |
| 5,692,093 A | 11/1997 | Iggulden et al. | 386/46 |
| 5,696,866 A | 12/1997 | Iggulden et al. | 386/46 |
| 5,848,397 A | 12/1998 | Marsh et al. | |
| 5,886,731 A | 3/1999 | Ebisawa | |
| 5,987,210 A | 11/1999 | Iggulden et al. | 386/46 |
| 5,995,092 A | 11/1999 | Yuen et al. | |
| 5,999,688 A | 12/1999 | Iggulden et al. | 386/46 |
| 6,215,526 B1 | 4/2001 | Barton et al. | 348/473 |

(Continued)

FOREIGN PATENT DOCUMENTS

AU 694568 3/1996

(Continued)

OTHER PUBLICATIONS

James Barton U.S. Appl. No. 60/186,551, Downloading Movies to Lots of People, Mar. 2, 2000.*

*Primary Examiner* — Thuong Nguyen
(74) *Attorney, Agent, or Firm* — McDonnell Boehnen Hulbert & Berghoff LLP

(57) ABSTRACT

Sending content between client devices connected to a computer network is described. According to one described aspect, a server maintains a database correlating unique identifiers for client devices to their network address information. A first client device may query the server for network address information of a second client device by sending the unique identifier to the server. The server returns the network address of the second client device, which is used to send a message directly from the first client device to the second client device, indicating the availability of content. Also, the message is preferably formatted such that it automatically populates a content guide of the second client device, with an entry used to initiate a transmission of the content from the first client device to the second client device.

21 Claims, 12 Drawing Sheets

U.S. PATENT DOCUMENTS

| | | | |
|---|---|---|---|
| 6,233,389 B1 | 5/2001 | Barton et al. | 386/46 |
| 6,269,394 B1 * | 7/2001 | Kenner et al. | 709/217 |
| 6,310,886 B1 | 10/2001 | Barton | 370/462 |
| 6,324,338 B1 | 11/2001 | Wood et al. | 386/83 |
| 6,327,418 B1 | 12/2001 | Barton | 386/46 |
| 6,360,053 B1 | 3/2002 | Wood et al. | 386/67 |
| 6,456,308 B1 * | 9/2002 | Agranat et al. | 715/854 |
| 6,839,769 B2 * | 1/2005 | Needham et al. | 709/243 |
| 7,908,635 B2 * | 3/2011 | Barton et al. | 725/134 |
| 2001/0054026 A1 * | 12/2001 | Choate | 705/52 |
| 2002/0087661 A1 * | 7/2002 | Matichuk et al. | 709/218 |
| 2002/0133821 A1 * | 9/2002 | Shteyn | 725/46 |
| 2002/0154892 A1 * | 10/2002 | Hoshen et al. | 386/87 |
| 2002/0162109 A1 * | 10/2002 | Shteyn | 725/87 |
| 2004/0128317 A1 * | 7/2004 | Sull et al. | 707/104.1 |
| 2005/0154681 A1 * | 7/2005 | Schmelzer | 705/67 |
| 2005/0216942 A1 * | 9/2005 | Barton | 725/97 |
| 2005/0240295 A1 * | 10/2005 | Vilcauskas et al. | 700/94 |

FOREIGN PATENT DOCUMENTS

| | | |
|---|---|---|
| DE | 199 39 410 A1 | 3/2001 |
| EP | 0 693 215 B1 | 11/1998 |
| EP | 1 071 287 A2 | 1/2001 |
| WO | WO 99/04561 | 1/1999 |
| WO | 99/52279 A1 | 10/1999 |
| WO | WO 99/52285 | 10/1999 |
| WO | 00/07368 A1 | 2/2000 |
| WO | 00/18108 A2 | 3/2000 |
| WO | 00/18108 A3 | 3/2000 |
| WO | 00/28736 A1 | 5/2000 |
| WO | WO 00/44171 | 7/2000 |
| WO | WO 00/56072 | 9/2000 |
| WO | 00/58833 A1 | 10/2000 |
| WO | 00/58834 A1 | 10/2000 |
| WO | 00/58967 A1 | 10/2000 |
| WO | 00/59214 A1 | 10/2000 |
| WO | 00/62298 A1 | 10/2000 |
| WO | 00/62299 A1 | 10/2000 |
| WO | 00/62533 A1 | 10/2000 |
| WO | 00/67475 A1 | 11/2000 |
| WO | 01/06370 A1 | 1/2001 |
| WO | 01/22729 A1 | 3/2001 |
| WO | 01/46843 A2 | 6/2001 |
| WO | 01/47238 A2 | 6/2001 |
| WO | 01/47249 A2 | 6/2001 |
| WO | 01/47279 A2 | 6/2001 |
| WO | 01/65762 A2 | 9/2001 |
| WO | 01/65862 A2 | 9/2001 |
| WO | WO 01/76249 A1 | 10/2001 |
| WO | 01/89203 A2 | 11/2001 |

* cited by examiner

METHODS AND APPARATUS FOR SENDING CONTENT BETWEEN CLIENT DEVICES

CROSS REFERENCE TO RELATED APPLICATIONS

This application claims priority under 35 U.S.C. §119(e) to U.S. Provisional Application No. 60/313,557, filed Aug. 19, 2001 and entitled "Internet Video Sharing," which is incorporated by reference herein in its entirety.

This application is related to application Ser. No. 10/124,064, filed on Apr. 16, 2002 and entitled "Resolving Recording Conflicts", application Ser. No. 10/215,904 filed on Aug. 9, 2002 and entitled "Network Video Unit", application Ser. No. 10/124,190 filed on Apr. 16, 2002 and entitled "Accessing Programs Using Networked Digital Video Recording Devices", and application Ser. No. 10/124,506, filed on Apr. 16, 2002 and entitled "Improved Guide Content Management", each of which is incorporated by reference herein in its entirety.

BACKGROUND OF THE INVENTION

1. Field of the Invention

This invention relates generally to digital content recording, and more particularly to sending content between client devices connected to a network.

2. Description of the Related Art

As various technologies for recording content such as videos and music have become available, there have been many attempts to allow people to send content to their friends and others. One example of a system that allows users to access and provide audio content operates in an Internet environment and implements a directory file server. Here, various client devices are configured with software for interacting with an Internet server that maintains a directory of audio content that is stored on each of the so configured client devices that are online at any given time. A user of a client device may navigate to the server and search the directory for a desired piece of audio content, and be provided with a list of one or more other client devices that are currently online and that store the desired content on their hard drive or the like. The server may then broker a communication between the "seeking" client device and a "storing" client device wherein the desired content is downloaded from the latter to the former. In this arrangement, the users of the storing and seeking devices are typically unknown to each other, connected only by the commonality that one user has a piece of content that the other discovered from the server directory. Although the server brokers communications between the two clients, the above transaction between the client devices is often referred to as an example of peer-to-peer communication.

One problem with this type of system is that a user must generally search a directory in order to obtain content. The reliability and quality of the content remain generally unknown, and the source of the content typically remains anonymous to the receiving party. The receiving party may typically rely upon a trial and error system of repeatedly downloading a targeted piece of content and examining its quality. Finally, some directory file server based systems allow unfettered copying of content among anonymous parties, which may be undesirable. Accordingly, the directory file server based system for obtaining content remains undesirable in many aspects.

Another problem with existing content sending systems is that they may be too complicated and cumbersome for novice users to operate. Particularly, users may be required to navigate to a previously unknown location to determine whether content is available, and when content is finally discovered the user may be required to invoke various software to capture the content.

Furthermore, particularly in the Internet environment, dynamic network addressing and local area network firewalls present significant obstacles to providing seamless connections between client devices, particularly where direct file transfers between client devices are desired.

What is needed is a more robust system for allowing users to avail content that they believe is desirable to others. Further needed is a system that is more user friendly, that allows recipients of content to very easily access the content, that allows two known client devices to directly engage in a content transfer, even where dynamic addressing schemes are present, and that overcomes some of the network based obstacles found in existing infrastructures.

SUMMARY OF THE INVENTION

The described embodiments of the present invention allow content to be sent between devices connected to a network. Although at least some embodiments of the invention are described in connection with a digital video replay unit, which allows a user to select and record video content, the invention is not intended to be limited to those types of devices.

In one embodiment, a sender can initiate a transaction wherein their selected recipient ultimately receives a piece of content. This allows that sender to deliver content to known parties, in contrast to anonymous systems such as the directory file server system.

In one aspect, the invention allows content to be transferred between client devices connected to a network, even where the network addresses of the clients are not directly determinable by each other. According to this aspect, a server having a readily determinable network address maintains a database correlating unique identifiers for client devices to their network address information. Where a user operating a first client device seeks to offer content to a user of a second client device, the first client queries the server for network address information of the second client by sending the unique identifier for the second client to the server. The server may then examine its database for an entry corresponding to the unique identifier, and return to the first client the network address of the second client.

Upon receipt of the network address information, the first client directly communicates its available content to the second client. The second client may then contact the first client, possibly implementing the above described network address determination functionality as well, in order to indicate a desire for the content, whereupon the content may be transmitted from the first client to the second client.

According to another aspect of described embodiments of the invention, the server may also store additional information to facilitate an exchange of content. In particular the server may maintain an association of logical port information to client devices using the unique identifier described above. Thus, the server can provide to a client device both the network address and port information corresponding to another client device that they would like to contact and transfer content to. Particularly, the logical port information might comprise a port that allows a particular type of file transfer operation that can be used to download content through a network firewall.

According to still another aspect of described embodiments of the invention, when a first client device sends an indication of content available at its location to another client device, information identifying and describing the available content is automatically provided to and imported into a user interface of the receiving device, so that the user may merely select the content in a very familiar fashion. Particularly, the information sent by the first client device automatically populates a content guide (e.g. a playback guide) of the second client device, such that a user of the second client device merely sees the available content as an entry in the content guide. The user of the second client device may then easily select the entry to initiate a download of the program corresponding to the entry.

BRIEF DESCRIPTION OF THE DRAWINGS

These and other more detailed and specific features of embodiments of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
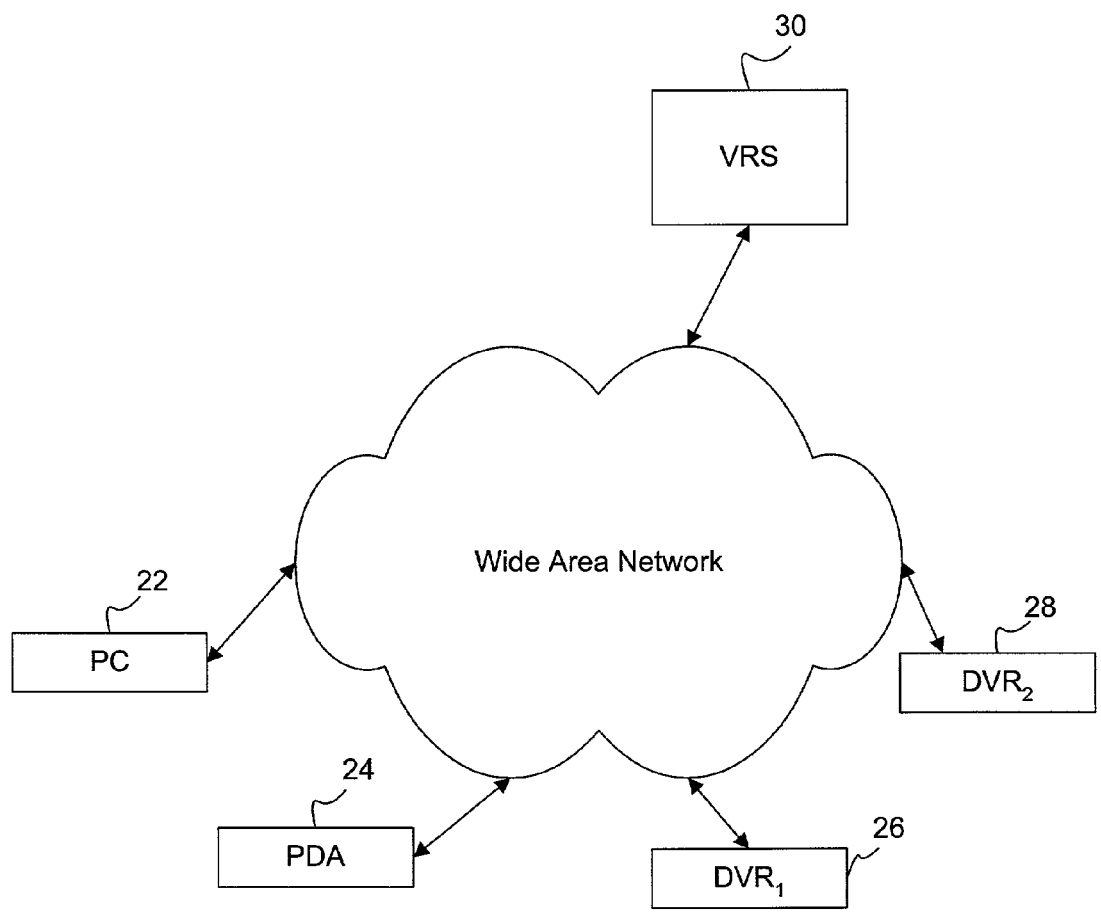
FIG. 1 is a schematic diagram illustrating an example of a system in which embodiments of the present invention operate.

The schematic diagram of FIG. 1 illustrates an example of a system 10 in which embodiments of the present invention may operate. Particularly, various client devices, such as a personal computer (PC) 22, a personal digital assistant (PDA) 24, a first digital video recorder ($DVR_1$) 26 and a second $DVR_2$ 28 may communicate with a video replay server (VRS) 30 through a wide area network (WAN). An example of a WAN is the Internet. The client devices 22-28 may directly or indirectly interface with the network, and may communicate with the VRS 30 using the Transmission Control/Internet Protocol (TCP/IP) protocol suite according to a traditional "client-server" communications model. Additionally, client devices 22-28 may communicate with each other according to what is referred to as a peer-to-peer communication model, provided that they have enough information to contact each other through the network.

One aspect of the present invention allows one client device (e.g. $DVR_1$ 26) to communicate the availability of a piece of content to another client device (e.g. $DVR_2$ 28) through a computer network such as the Internet. One obstacle in communicating to a device using the Internet is the proliferation of dynamic address spaces. Most likely, the intended recipient of the piece of content will not have a fixed or static address, so the network address will generally impossible or at the very least impractical for the sending party to determine. Additionally, it would be undesirable to force DVR users to subscribe to a dynamic domain name system (DNS) service in order to establish an emulated static address for the purposes of sending and receiving content among other known users.

Here, in lieu of subscribing to a general dynamic DNS service, a $DVR_1$ 26 locates another $DVR_2$ 28 by querying the VRS 30 for the current network address of the other $DVR_2$ 28. Each device registered on the video replay system will have a unique identifier that is stored by the VRS 30. Preferably, the unique identifier is an Internet Serial Number (ISN) that is assigned to the unit. The VRS 30 maintains an association between the ISN and the current network address for individual DVRs 26,28 on the system, and can therefore return current network addresses to DVRs in response to such queries.

Preferably, the VRS 30 implements a static address or an address that is ascertainable through a dynamic DNS service. Thus, registered devices may seamlessly report their current network addresses to the VRS 30, which updates its maintained association of ISNs to network addresses and any other information necessary to allow direct DVR to DVR transfers as needed.

Once a $DVR_1$ 26 receives the current network address for the other $DVR_2$ 28, it can send a message directly to the other $DVR_2$ 28 identifying the available piece of content. Preferably, a hypertext transfer protocol (HTTP) communication is used to send this message directly from the sending DVR 26 to the receiving DVR 28. The message contains information to graphically display information about the available piece of content for review and acceptance. Preferably, this information will include at least the title of the piece of content.

The graphical display allows the user to easily indicate desired receipt of the piece of content. For example, a content guide showing existing and or available titles may be displayed, along with other information such as the source of each available title. Other aspects of the present invention pertaining to the graphical user interface are described further below.

Another obstacle to direct communications between DVRs 26, 28 through the Internet is the possibilities of local area network (LAN) firewalls, which may require, among other things, particular logical port information for certain types of data or file transfers. In addition to identifying current network addresses as described, the VRS 30 may store and maintain additional information to facilitate a communication between two DVRs on the system, such as port information to allow transfers between DVRs protected by local area network firewalls.

In any case, the user of the receiving $DVR_2$ 28 may select the piece of content, whereupon the sending $DVR_1$ 26 is contacted in a fashion similar to that described regarding the message sending operation above. Particularly, the $DVR_2$ 28 queries the VRS 30 for the network address by sending it the ISN of the other $DVR_1$ 26 (which it would have either previously established, or which it may have received in the message indicating availability of the piece of content), and uses the address to request a transmission of the piece of content from the sending $DVR_1$ 26 to the receiving $DVR_2$ 28. Preferably, the content is transmitted using HTTP or the File Transfer Protocol (FTP). Other aspects of the present invention pertaining to the transfer of content are described further below, but any transmission of the content including but not limited to reading, streaming, and downloading are contemplated by the present invention.

Although the transmission of video content between two DVRs 26,28 is described, the invention is equally applicable to the transmission of all forms of content, including audio content, or any multimedia content, between various devices 22-28, including but not limited to those illustrated in FIG. 1. Thus, the present invention contemplates and encompasses devices such as a PC 22 or PDA 24 as well as operations performed by such devices.

Figure 2:
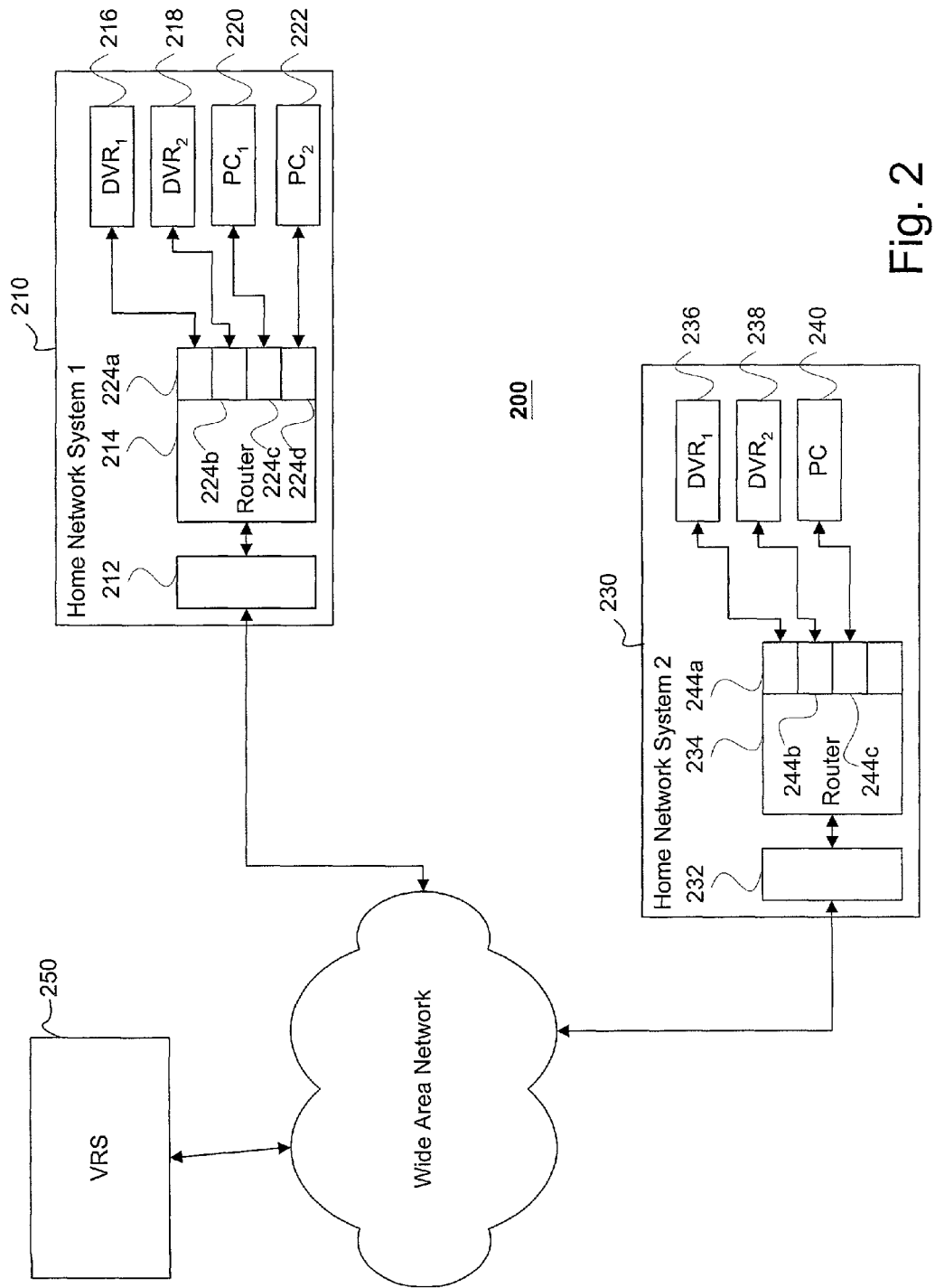
FIG. 2 is a schematic diagram illustrating another example of a system in which embodiments of the present invention operate.

The schematic diagram of FIG. 2 illustrates another example of a system 200 in which embodiments of the present invention may operate. As with the system 10 of FIG. 1, various devices including a number of DVRs 216, 218, 236, 238 and PCs 220, 222, 240 may communicate with a video replay server (VRS) 250 or each other using the wide area network. Home network system 210 is shown to include a broadband interface 212 and a router 214, through which two DVRs 216, 218 and two PCs 220, 222 connect to other devices on the wide area network, such as the VRS 250. Preferably, the wide area network is the Internet. The broadband interface 212 may be a conventional digital subscriber line (DSL) modem, cable modem, or any device providing an interface between the home network and a broadband connection, including wired, wireless and any alternative broadband connections. Additional equipment, such as conventional DSL Central Office equipment that may interface standard twisted pair lines coming from the DSL modem and the Internet is not and need not be shown for an understanding of the present invention. Of course, the system may be configured such that only DVRs may send content to other DVRs, or such that PCs could not send content to DVRs. Indeed, these may be preferred implementations.

The router 214 may act as a firewall between the devices 216-222 within the home network 210 and other devices potentially connecting with those devices through the Internet. Logical ports 224a-d may be assigned for certain Internet communications made between the devices 216-222 and other devices outside the home network 210. As described previously, these logical ports would provide an additional barrier to certain peer-to-peer transfers between two "client" devices.

Similar to home network 210, the other shown home network 230 includes a broadband interface 232 and router 234 through which client devices 236-240 may connect to the Internet, using logical ports 244a-c.

Figure 3:
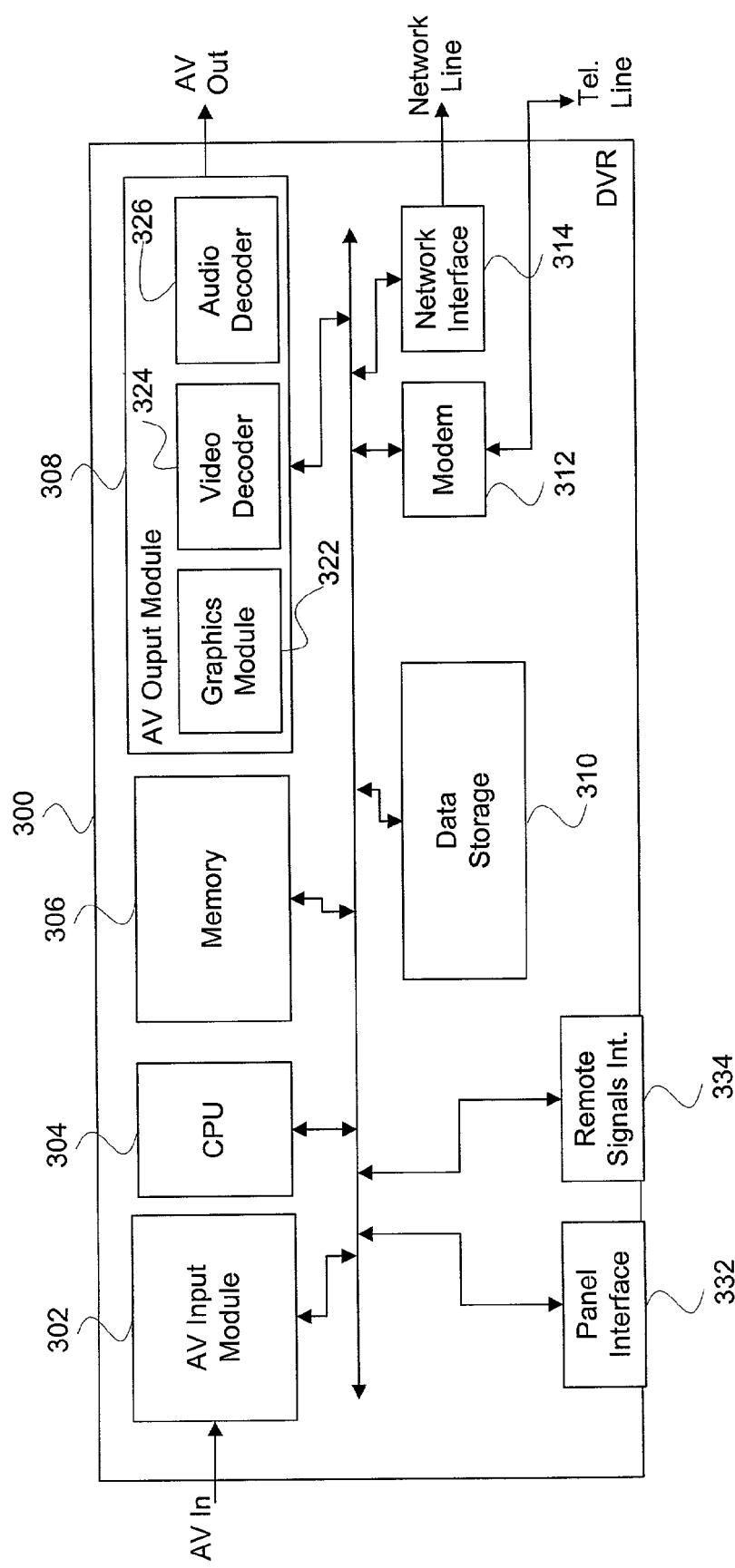
FIG. 3 is a block diagram illustrating an embodiment of a digital video recorder configurable in accordance with the present invention.

Digital Video Recorders:

The block diagram of FIG. 3 illustrates a DVR 300 incorporating methods and apparatus for sending content in accordance with the present invention. The DVR 300 may also be referred to as a Personal Video Recorder (PVR), One example of a DVR 300 is the ReplayTV brand of DVRs provided by SONICblue Incorporated, a Santa Clara, Calif. company.

Still referring to FIG. 3, the DVR 300 includes an AV input module 302, CPU 304, memory 306, AV Output module 308, data storage medium 310, modem 312 and network interface 314 interconnected by a conventional bus architecture. Generally, the CPU 304 executes instructions such as those stored in memory 308 to provide functionality including that provided by certain embodiments of the present invention. Additional memory such as ROM and/or EEPROM (not shown) may store instructions for boot up sequences, DVR functionality updates, or other information. The network interface 314 is conventional and may, for example, allow connection to an Ethernet based network. This connection may be used to connect to a home network and in turn a broadband connection to a WAN such as the Internet as previously described in connection with FIG. 2, or any of various alternative broadband connections. In addition to traditional broadcast and other input AV signals, the broadband connection may also source content that is shown, recorded and sent to other users in accordance with the present invention.

The user may control the operation of the DVR 300 through control signals provided on the exterior of the DVR 300 housing through the panel interface 332, or through control signals originating from a remote control, which are received through the remote signals interface 334, in conventional fashion.

The AV input module 302 may receive input through various conventional interfaces, including coaxial RF/Ant, S-Video, network interfaces, and others, which need not be shown for an understanding of this invention. The received signals may originate from standard NTSC broadcast, high definition (HDTV) broadcast, standard cable, digital cable, satellite, Internet, home video (e.g., VHS) or other sources, with the AV input module 302 being configured to include appropriate conventional tuning and/or decoding functionality. The DVR 300 may also receive input from another devices, such as a set top box that receives one signal format and outputs an NTSC signal or some other conventional format.

The AV input module 302 may also include one or more MPEG encoding modules that convert signals from a first format (e.g. analog NTSC, VHS, S-Video or other conventional format) into an MPEG format (e.g. MPEG-2) that may be stored in the memory 308 or data storage medium 310, which is preferably a hard disk. Various capacities can be provided. Currently about 1 hour of programming is stored at standard (i.e., relative lowest on system) quality for each gigabyte of storage. Typically, content corresponding to the formatted data stored in the data storage medium 310 may be viewed immediately, or at a later time. Additional information may be stored in association with the MPEG data to manage and identify the stored programs.

The AV output module 308 further illustrates a graphics module 322, video decoder 324 and audio decoder 326. The video decoder 324 and audio decoders 326 are preferably MPEG decoders that can obtain the MPEG data stored in the data storage medium 310 and convert it to format compatible with the display device, typically the NTSC format that can be readily received by a conventional television set. The graphics module 322 receives various guide and control information and provides signals for corresponding displays, outputting them in a compatible format.

The DVR 300 processes guide information that describes and allows navigation among content receivable by a system (e.g. the broadcast system) at present or future times, as well as content that has already been captured by the DVR 300. Guides that display such information may generally be referred to as "content guides." These content guides include "channel guides" and "playback guides." A "channel guide" displays available content from which individual pieces of content may be selected for current or future recording and viewing. In a specific case, the channel guide may list numerous broadcast television programs, and the user may select one or more of the programs for recording. The other type of content guide may be referred to as a "playback guide," which displays content that is stored or immediately storable by the DVR 300. Other terminology may be used for the guides. For example, they may be referred to as programming guides or the like. The term content guide is intended to cover all of these alternatives.

The programs that can be listed in the content guide extend beyond familiar television programs that are broadcast by television and cable television networks. For example, programs also include recordings of home videos, home photographs, duplicated versions of content previously purchased by a user in another form (e.g. a movie on a video cassette), or any content that can be recorded by the unit and which is then displayable as a "program" in the content guide. A video program may also be referred to as a video recording.

One example of a DVR 300 that may incorporate embodiments of the present invention is the ReplayTV brand of DVRs provided by SONICblue Incorporated, a Santa Clara, Calif. company. A Replay Guide is an example of a playback guide implemented by ReplayTV DVRs.

Conventional content guide source data and programming techniques can be used to generally provide content guide displays. One source of guide data may be Tribune Media Services, which may provide the guide information to the DVR 300 through the telephone line modem 312. Alternatively, the guide data may be provided from other sources and may be provided through any available connection including but not limited to the network interface 314 or along with a broadcast programming signal stream.

Although certain modular components of a DVR 300 are shown in FIG. 3, the present invention also contemplates and encompasses units having different features. For example, some devices may omit features such as the telephone line modem, instead using alternative conduits to acquire guide data or other information that may be used in practicing the present invention. Additionally, some devices may add features such as a conditional access module (CAM), such as one implementing smart card technology, which may work in conjunction with certain content providers and/or broadcasters of content.

Additionally, although this embodiment and other embodiments of the present invention are described in connection with a DVR or PVR, the invention is equally applicable to other devices including but not limited to a set top box (STB), cable STB, satellite STB, or televisions containing modules with similar functionality.

Figure 4:
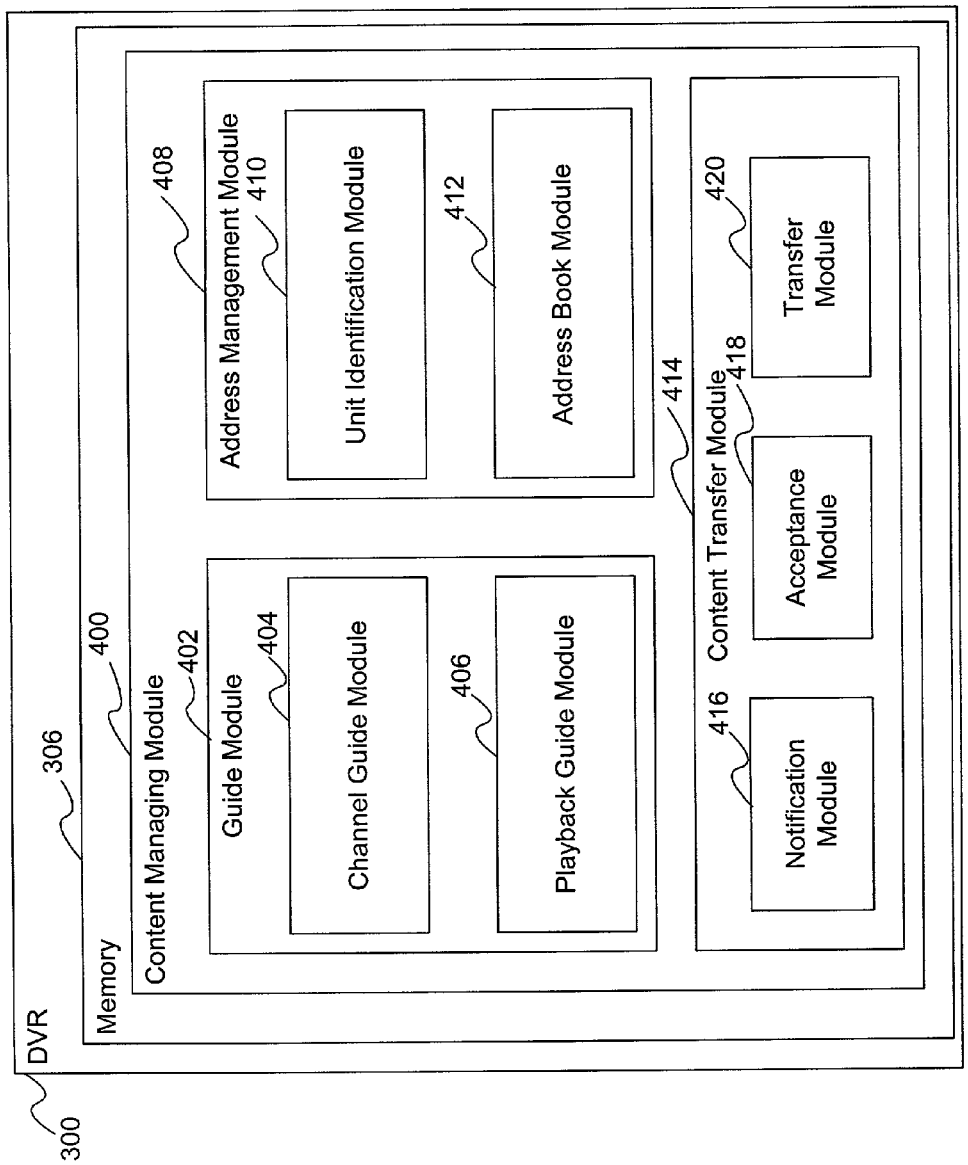
FIG. 4 is a block diagram illustrating an embodiment of a content managing module for sending content between client devices, configured in accordance with the present invention.

Preferably, the functionality for sending content described in connection with the present invention is provided by software, although such functionality may also be provided by hardware, firmware, or any combination thereof. The block diagram of FIG. 4 illustrates an embodiment of a DVR 300 memory 306, which preferably includes a conventional engine (not shown) that provides the necessary framework and APIs on which applications and other software will operate. Although any conventional software may be supported, preferably the engine will support Extensible Markup Language (XML), Hypertext Markup Language (HTML), and Hypertext Transfer Protocol (HTTP) applications and modules.

Further illustrated is an example of a modular breakdown for software that provides an embodiment of the content sending functionality described herein. Although one modular breakdown is shown, it should be understood that the content sending functionality may be variously embodied, and may be provided by more or less modules. Still referring to the example in FIG. 4, the content managing module 400 is shown to include a guide module 402 including a channel guide module 404 and a playback guide module 406, an address management module 408 including a unit identification module 410 and an address book module 412, and a content transfer module 414 including a notification module 416, an acceptance module 418 and a transfer module 420. The guide module 402 includes routines for managing the display of the various guides. Further, the channel guide module 404 and the playback guide module 406 include routines for respectively managing the display of the previously introduced channel guides and playback guides. The address management module 408 generally includes routines for allowing the DVR 300 to communicate with and identify other DVRs 300, and further includes a unit identification module 410, which stores a unique identifier that corresponds to the DVR 300, and an address book module 412, which manages and displays address book based information about other DVRs 300 and their users, which in turn is used to accommodate the sending and receiving of content from such users. Finally, the content transfer module 414 generally includes routines for actually transferring content between DVRs 300, and is illustrated to include a notification module 416 having routines for preparing messages that indicate the availability of content to other devices, an acceptance module 418 having routines for responding to the indication of available content, and a transfer module 420 having routines for performing the transfer of content from one DVR 300 to another. The functionality of the content managing module 400 is further understood with reference to the flow diagram of FIG. 5 and the graphical illustrations of FIGS. 6-8.

Figure 5:
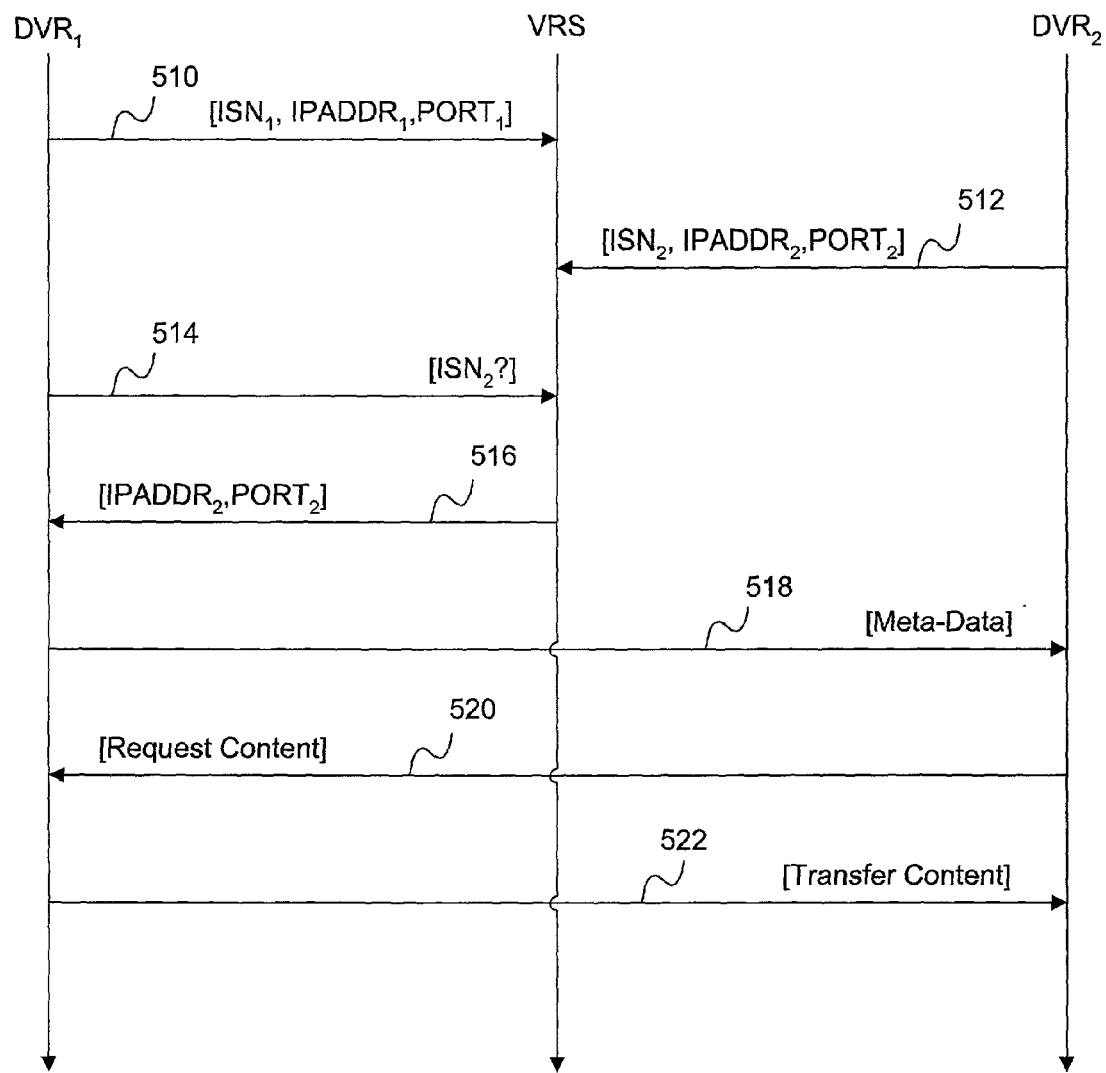
FIG. 5 is a flow diagram illustrating an embodiment of a method for sending content between client devices in accord with the present invention.

Referring now to the flow diagram of FIG. 5, illustrated therein is an embodiment of sending content between two DVRs in accordance with the present invention. On a regular basis (configurable value, for example every other hour) or every time that relevant information such as a DVR IP address or port number changes, a unit sends information to the VRS. Particularly, $DVR_1$ periodically transmits (510) its ISN, current IP address, and port information [$ISN_1$, $IP_1$, $Port_1$] to the VRS. Similarly, $DVR_2$ periodically transmits (512) its analogous parameters [$ISN_2$, $IP_2$, $Port_2$] to the VRS. The VRS then updates its database as new information becomes available. In one embodiment, the parameters are reported (510, 512) from the DVRs to the VRS using conventional HTTP queries. Various alternatives such as UDP packets may also be used to report the parameters to the VRS.

A "send" operation, for indicating available content is now described. If necessary, a DVR may query (514) the VRS to obtain the most recently reported IP address and port information for another DVR, whereupon the VRS checks its database and returns the current information. For example, $DVR_1$ may seek connection information regarding $DVR_2$ by reporting the $ISN_2$ for the unit to be located. Here, the query (514) would indicate $ISN_2$ as the ISN of the unit to be located. The VRS responds to this query by returning (516) the parameters [$IP_2$, $Port_2$] for the located DVR.

The sending $DVR_1$ then transmits (518) a set of information corresponding to the offered content. Preferably, the set of information is used to automatically populate the receiving DVR2 content guide with information corresponding to the offered content. In one embodiment, the sending $DVR_1$ queries through an HTTP POST or PUT a CGI on the receiving $DVR_2$. This CGI will then automatically add an entry in the receiving $DVR_2$ content guide, preferably its playback guide, to indicate the availability of the content to the user of the receiving $DVR_2$.

In the example where the offered content is a video program, various files may be used to index the video program, describe the program and to actually provide the program. In one embodiment, an index file, an XML meta-data file and an MPEG2 file respectively provide the index, descriptive information for the video program, and the actual video file. For file management purposes, these files may be commonly named (e.g. prog_id.idx, prog_id.xm/, and prog_id.mpg). The XML meta-data file contains descriptive information that is used to populate the $DVR_1$ playback guide. This meta-data file may be transmitted (518) as the set of information corresponding to the content offered to the receiving $DVR_2$. The CGI contains instructions to use this meta-data to automatically create an entry in the receiving $DVR_2$ playback guide.

An example of a format for the meta data includes the following fields: title="[title]", filedurationinseconds=" [value in seconds]", episodetitle="[name of episode]", description="[textual description of episode]", actors="[list of actors]", director="[director's name]", yearmade= "[date]", quality="[quality tag (e.g. standard)]." The various fields have corresponding values or information as indicated. Some or all of these pieces of information are used to populate corresponding areas of the receiving $DVR_2$ content guide to allow identification and selection of the content corresponding to the entry. This is just an example and the ordinarily skilled artisan will recognize the alternatives.

The receiving $DVR_2$ may then accept the "sent" content, whereupon the actual content is transmitted from the sending $DVR_1$ to the receiving $DVR_2$. Particularly, as shown in FIG. 5, the receiving $DVR_2$ transmits a message (520) to the sending $DVR_1$ accepting the content, and therefore requesting the download. Preferably an HTTP query requests chunks of file content corresponding to the identified video file.

The receiving $DVR_2$ may also pre-allocate the local hard drive to ensure adequate space is reserved for the entire transfer, and may also query the sending $DVR_1$ regarding the amount of memory that the incoming content will require, and receive a corresponding response (not shown in FIG. 5). Preferably, the file size is sent with the original indication of the availability of the content (step 518), negating the need for the steps of requesting and receiving the file size.

When the sending $DVR_1$ receives the acceptance, transmission (522) of the actual content from the sending $DVR_1$ to the receiving $DVR_2$ is established. The $DVR_1$ may determine whether the content still resides in its hard drive and provide corresponding warnings as described further below. Here, it is assumed that the content has not already been and won't be deleted from the sending $DVR_1$ hard drive.

Preferably, an HTTP based transfer accommodates the download, although FTP or other alternatives may also be provided. Content in various formats may be transferred. Continuing with the video program example provided above, the actual video content (prog_id.mpg) and a corresponding index file (prog_id.idx) are transferred to the receiving $DVR_2$.

Preferably, the content to be downloaded is divided into chunks, or blocks, that are iteratively transferred from the sending $DVR_1$ to the receiving $DVR_2$. This allows an interrupted download to proceed at an intermediate stage, rather than requiring a full download. Again, HTTP may be used for the file transfer, so each block will be retrieved through an HTTP call to a CGI with specific parameters, such as the number of the requested block and the size of each block. As described previously, the VRS maintains network address and port information for DVRs. The HTTP calls would include the needed port information to allow the file transfer.

The diagrams of FIGS. 6-8 illustrate examples of displays for sending content between DVRs that may be used in accordance with the present invention.

The Internet Address Book:

An "Internet Address Book" (LAB) may be used to manage information regarding users in sending and receiving content with a DVR. As described previously a unique identifier such as an ISN is used to arrange peer-to-peer connections between DVRs. A user may be asked to enter information including an identifier during initial set up, or at some time prior to engaging in the user's first "send" operation, to facilitate a response to the send operation. In one embodiment, the user will enter the ISN and possibly a custom name that they may also assign to their unit. An example of an ISN is the MAC address of the network card in the DVR, in decimal numbers, to allow remote keypad based entry of the ISN at the user's and other users' DVRs (example: 12233-14511-25022). Alternatively, the number may automatically appear in an entry form. There, the user may merely be asked to enter the custom name. The custom name is typically used to identify IAB entries in lieu of the ISN, which would be less recognizable to the user.

Figure 6A:
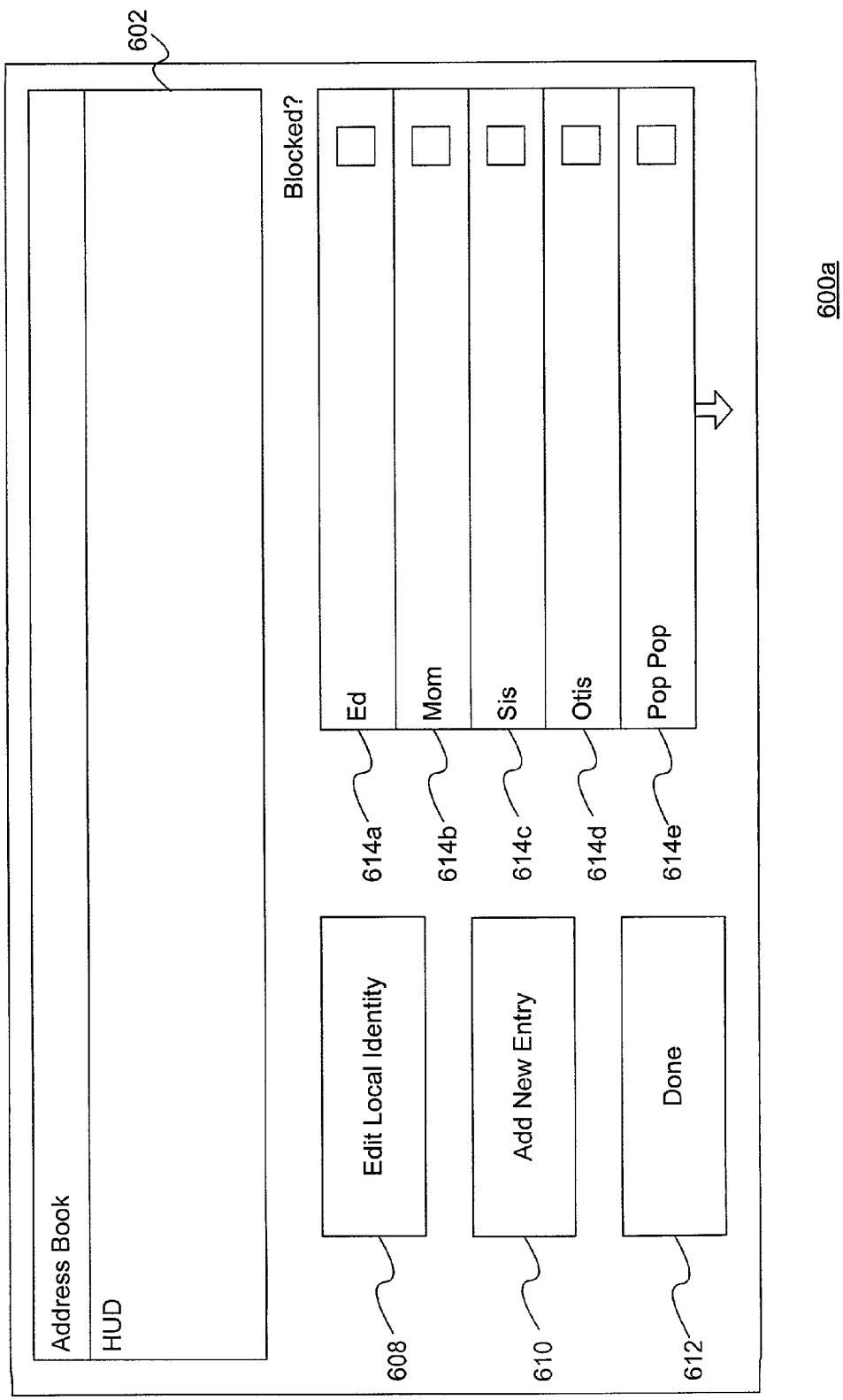
FIGS. 6A and 6B are examples address book displays used in conjunction with embodiments of the present invention.

An example of an IAB display 600 is shown in FIG. 6A. This IAB display 600 includes a Heads Up Display (HUD) 602, which contains instructions or information pertaining to a selection in the remainder of the IAB display 600. A left hand column generally includes "Edit local identity" 608, "Add new entry" 610, and "Done" 612 buttons, and a right hand column generally lists entries 614*a-e* in the user's JAB, which may be variously sorted (e.g. alphabetically), and which may also scroll where the number of entries exceeds the display space. As illustrated in the figure, preferably the entries 614*a-e* display names that the DVR user can enter, so that they can recognize the people in their IAB more readily.

The "Add new entry" button 610 produces a display prompting the user for the ISN of the entry they wish to add. A conventional display for gathering the information may be used, and is not shown. Various alternatives for obtaining the ISN may be provided. One technique is to have the DVR user call the user of the DVR unit to be added to the JAB, whereupon it may be orally conveyed to the DVR user for entry. The local DVR then uses the ISN to contact the remote DVR, using the VRS as described previously, and retrieve its name, and the entry is added to the right hand column of the JAB display.

Various alternatives may also be used to gather new IAB entries. For example, a first DVR user may give their ISN or custom name to a second DVR user, which may then be entered in their unit and used to automatically pass information from the second DVR to the first DVR. This alternative could prevent forcing two users that know each other from both having to enter the ISN information.

When the user navigates onto the "Edit local identity" button 608, the HUD 602 displays the local DVR's ISN and custom name, and a screen allowing alteration of DVR information is provided. Preferably, the screen (not shown) allows the user to change their custom name. Custom name changes may or may not be updated in other user's IABs. If the custom name changes do not automatically occur in other user's IABs, then they will preferably update the next time each other DVR engages in a network communication with the DVR having the custom name change.

Figure 6B:
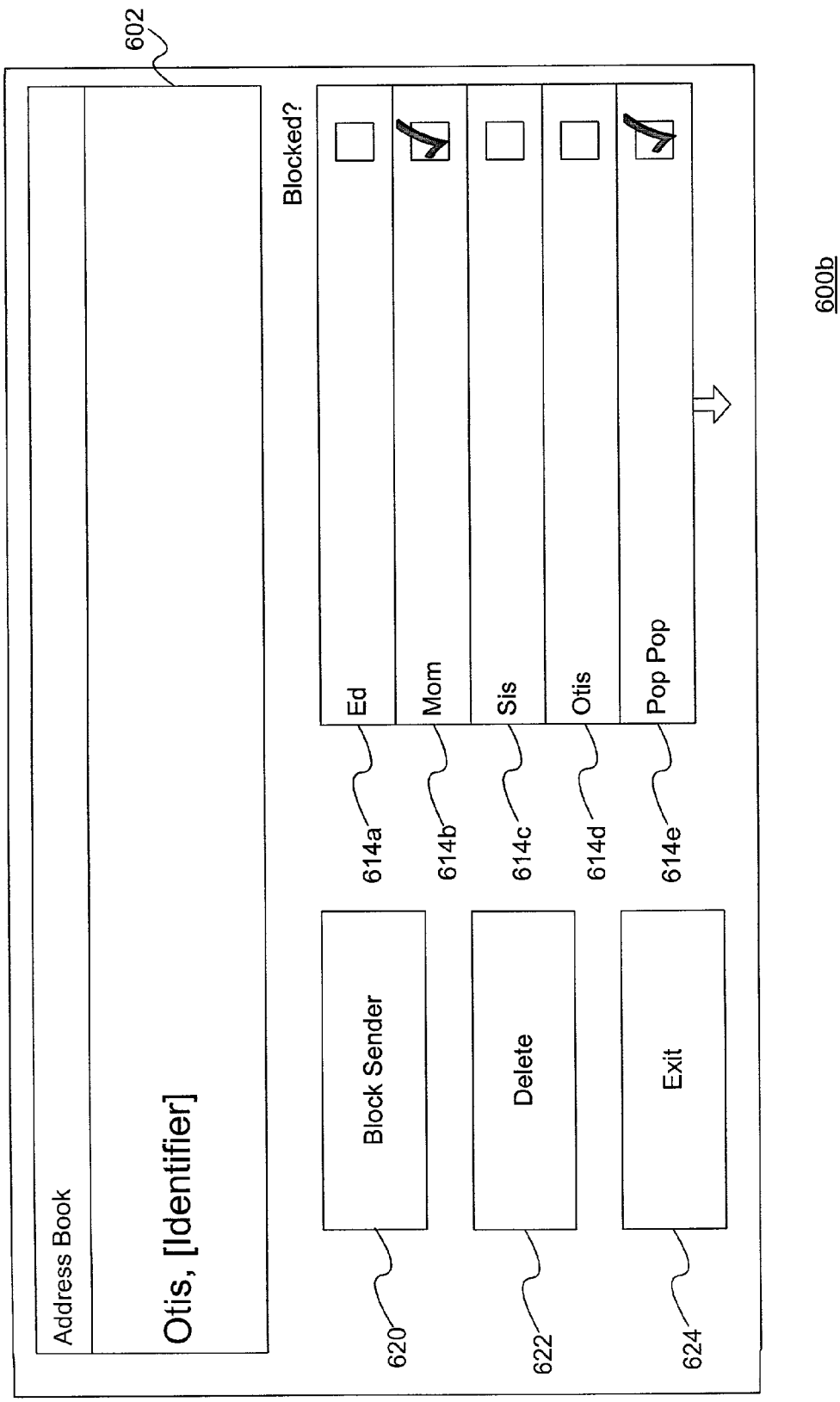

When the user navigates to an entry in the right hand column 606, the HUD 602 may display detailed information about the entry such as the unit's ISN and custom name. Particularly, as shown in FIG. 6B, when entry 614*d* is selected, the HUD 602 displays information corresponding to the entry having the custom name "Otis," including the custom name and the ISN. Additionally, when another user is selected from, "Block/Unblock Sender" 620, "Delete" 622, and "Exit" 624 buttons are provided. The Block/Unblock Sender button 620 actually toggles between an indication of "Block Sender" when the entry is not blocked, and vice versa. If the user selects the Block sender button 620, then the DVR from that entry is blocked from sending programs to the DVR and a check mark may appear in the "Blocked" check box for that entry, as is shown for entries 614*b* and 614*e* in FIG. 6B. If the user selects "Unblock sender", the sender will no longer be blocked and the check mark will disappear. If the user selects the delete button 622 the corresponding user will be deleted, possibly after confirmation. If the user selects the exit button 624, the menu will disappear and the display will most likely return to the default IAB display of FIG. 6A. When, the user selects the done button 612, the IAB display 600 (FIG. 6A) also goes away.

Various control alternatives can be provided for the IAB functionality, and the above should merely be considered an example of a way to collect and manage ISN and other user information.

Figure 7A:
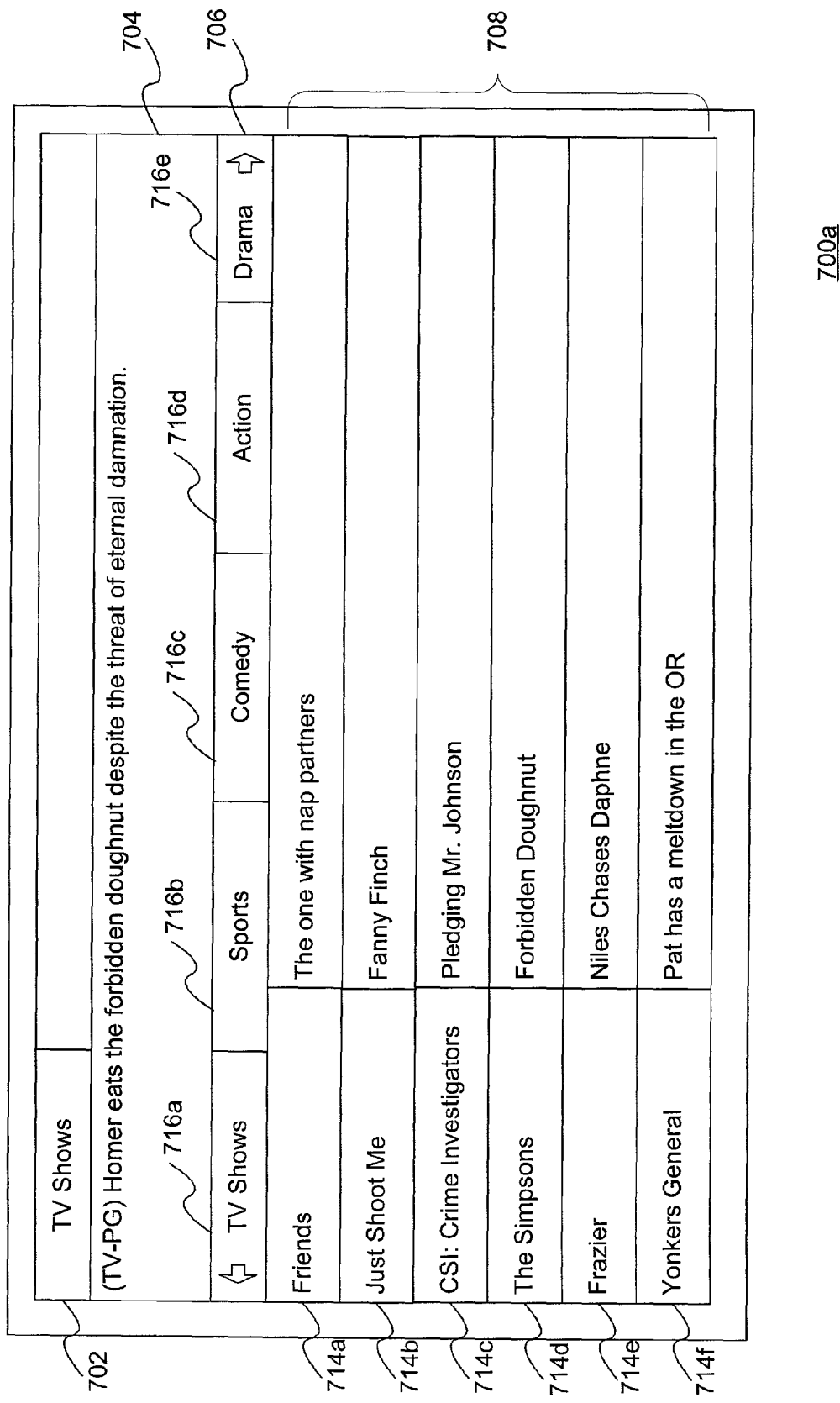
FIGS. 7A through 7C are examples of a content guide and corresponding displays that allow a user to send content.

"Sending" Content:

FIG. 7A illustrates an example of a playback guide display 700 to include header 702, HUD 704, category 706 and content display 708 regions. The header region further identifies a current category, such as "TV Shows" as indicated in the figure.

The content display region 708 includes a plurality of entries or rows 714*a-f* identifying the various content that is available for replay, and may further include columns to help describe the content, such as the shown show title and corresponding short description columns. Conventional remote control signals (e.g. arrows) may be used to navigate among the various entries in the content display region 708. For the currently highlighted region, additional information is provided in the HUD region 704. Navigating to the category region 706 and selecting a desired tab 716*a-e* can also alter the content display region 708. Particularly, the "TV Shows" (716*a*) category is shown, but a list of content available under the "Sports" category can be accessed by navigating to and selecting the Sports tab 716*b*, and similarly for the remaining categories 716*c-e*. Where the number of available categories exceeds the display space, a spinner may be used to navigate among additional categories.

Although certain categories are shown, they can obviously vary. Also, the user can create custom categories and choose filtering criteria that is used to populate the category. Others types of custom categories can house a user's personally prepared content. For example, a user can keep a "home videos" category. By selecting the home videos tab in the category region, a user prompts display of all of the home videos that they have loaded into their DVR. They can also send these home videos (or other programs such as photographs that have been loaded into the DVR, etc.).

Figure 7B:
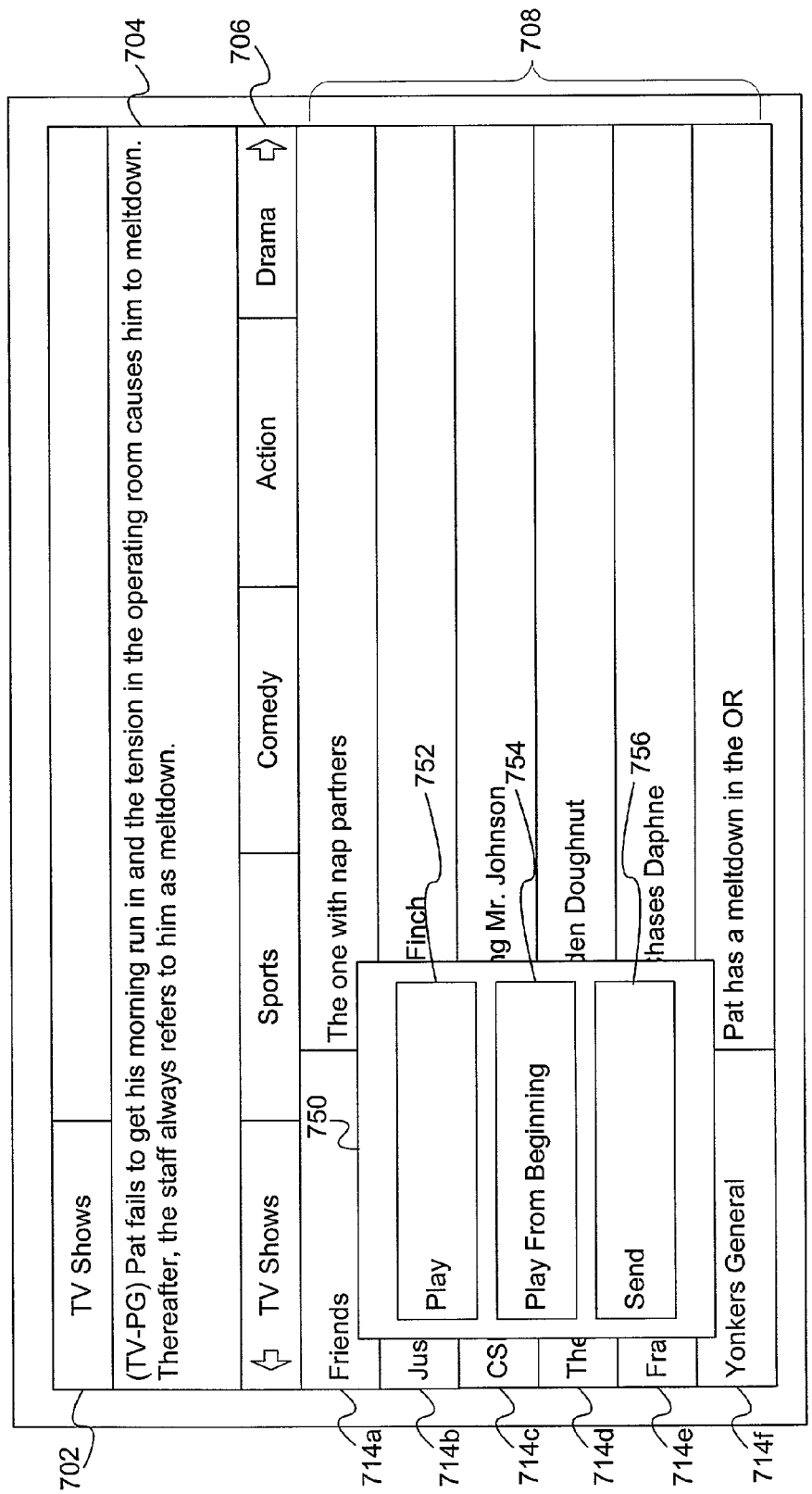

In accordance with this embodiment of the present invention, options including offering "sending" content to another user may be displayed when an entry in the content display region 708 of the playback guide 700 is selected. Particularly, the user may navigate to an entry for a listed title, and then enter a control signal to receive a pop up menu 750 listing options as shown in FIG. 7B. Here, the selected program is entitled "Yonkers General" (714*f*) and the HUD 704 is updated accordingly. The pop up menu 750 includes "Play" 752, "Play from beginning" 754, and "Send" 756 buttons, which may each be engaged for the listed program. The option chosen from the pop up menu will operate on the currently selected program (Yonkers General). The play 752 and play from beginning 754 buttons provide conventional DVR functionality for the program.

Figure 7C:
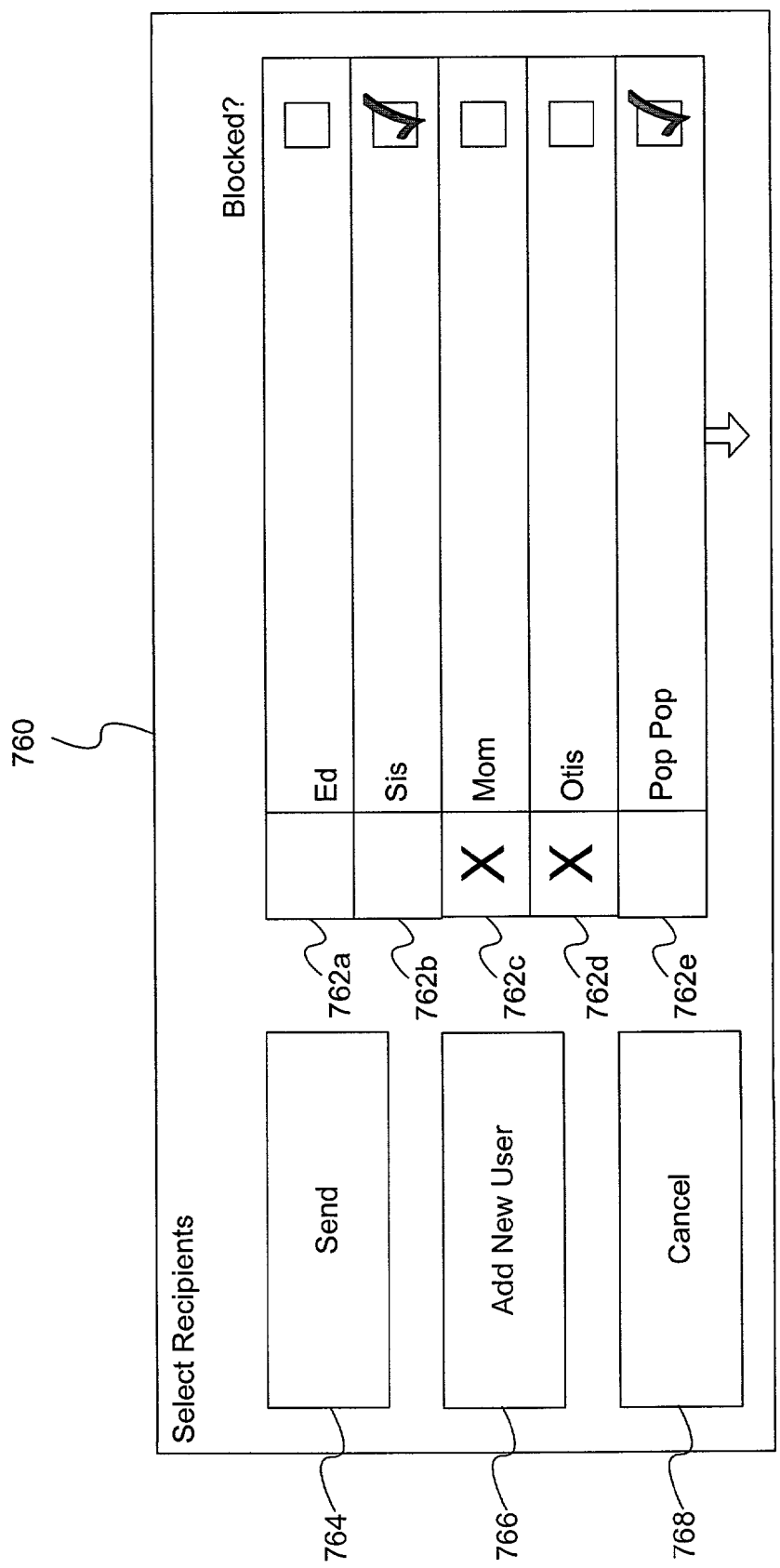

Preferably, the send option will only appear once a program has finished recording, but other alternatives may be provided, such as allowing partially completed records to be offered to other users. When the user selects the send button 756, a new display menu entitled "Select recipients" 760, as shown in FIG. 7C will appear.

The "Select recipients" menu 756 imports a list of the users from the local IAB, shown as entries 762*a-e*. This list includes the name of the user, the previously described block indicator, and a checkbox at the left side of each entry. The user may select one or more users off of the list to build a set of recipients for the program, such as by navigating to their entry and selecting, whereupon an X appears in the box at the left side of the entry. This functionality can toggle to provide the opposite functionality (i.e. removing users from the send list) as well. Here, the recipients are selected as Mom (762*c*) and Otis (762*d*).

The user may also select the "add a new user" button 766, which provides a menu (not shown) to add a new user similar to the previously described menu, and automatically adds the new user to the list of intended recipients upon completion.

Once the user is satisfied with the list of recipients, they may select the send button 764. If they elect not to send, they may press the cancel button 768. When the user selects "Send", they may be presented with a confirmation screen that summarizes the program they are sending along with the list of recipients.

In certain embodiments, it may be desirable to limit the number of recipients that a user can send a program to. For example, the number of recipients may be limited to 15. Various accounting and notification options may be provided to ensure recipient limits. Additionally, the DVR may be made compliant with copy protection schemes, if desired. For example, Macrovision and CGMS-A copy protected programs might be restricted from being sent, with appropriate notification.

When the sender completes the send of a program, information indicating the availability of the program is sent to the recipient(s). The network addresses of the recipient units may be obtained from the VRS as described above, particularly where it is found that the current network address corresponding to a recipient unit is no longer valid.

Various options may be used to inform the sender regarding the success or failure of a "send" operation. Once the user sends a program, each recipient is ultimately notified and may accept the offered content and begin a transfer. Various options may also be provided for informing the sender regarding the status of previously sent content. For example, if the sender of a program selects "delete" for a program while a transfer is in progress, the sender may be notified that a recipient is currently receiving the program, and will be asked to confirm the delete. If they confirm the delete, the transfer is aborted and the receiver is notified as described below.

Receiving "Sent" Content:

In accordance with one aspect of the present invention, when a DVR user "sends" a program or other content to another user, the receiving DVR is automatically provided with information to populate a content guide with an entry that may be selected, whereupon the recipient may initiate an actual transfer of the content, as described previously.

Preferably, the sending DVR transmits a set of information corresponding to the offered content to the receiving DVR, which information is used to automatically add an entry in the receiving DVR's playback guide to indicate the availability of the content. This information may comprise XML meta data corresponding to a video program as described in connection with FIG. 5 above.

Figure 8A:
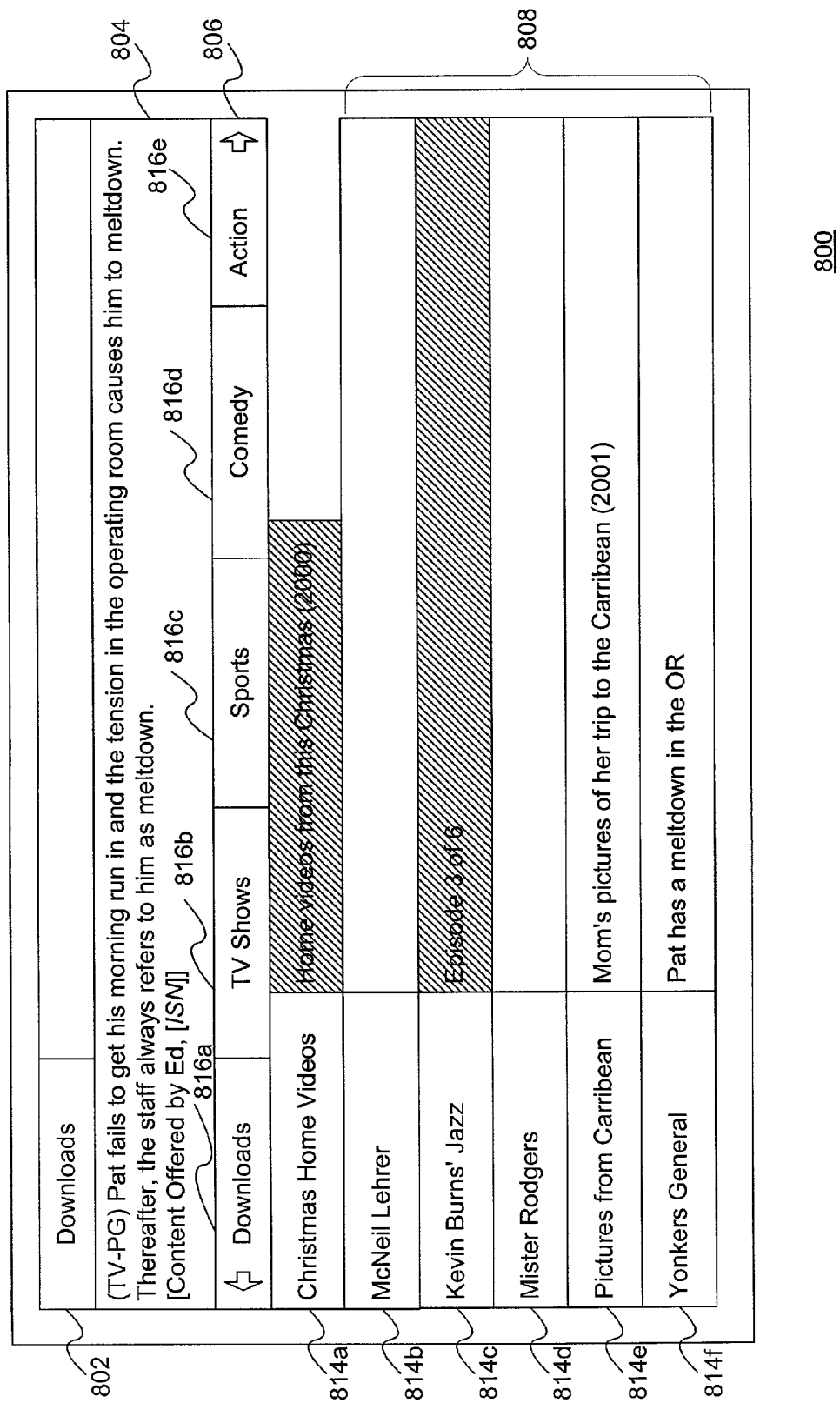
FIGS. 8A through 8B are examples of a content guide and corresponding displays that allow a user to receive sent content.
Figure 8B:
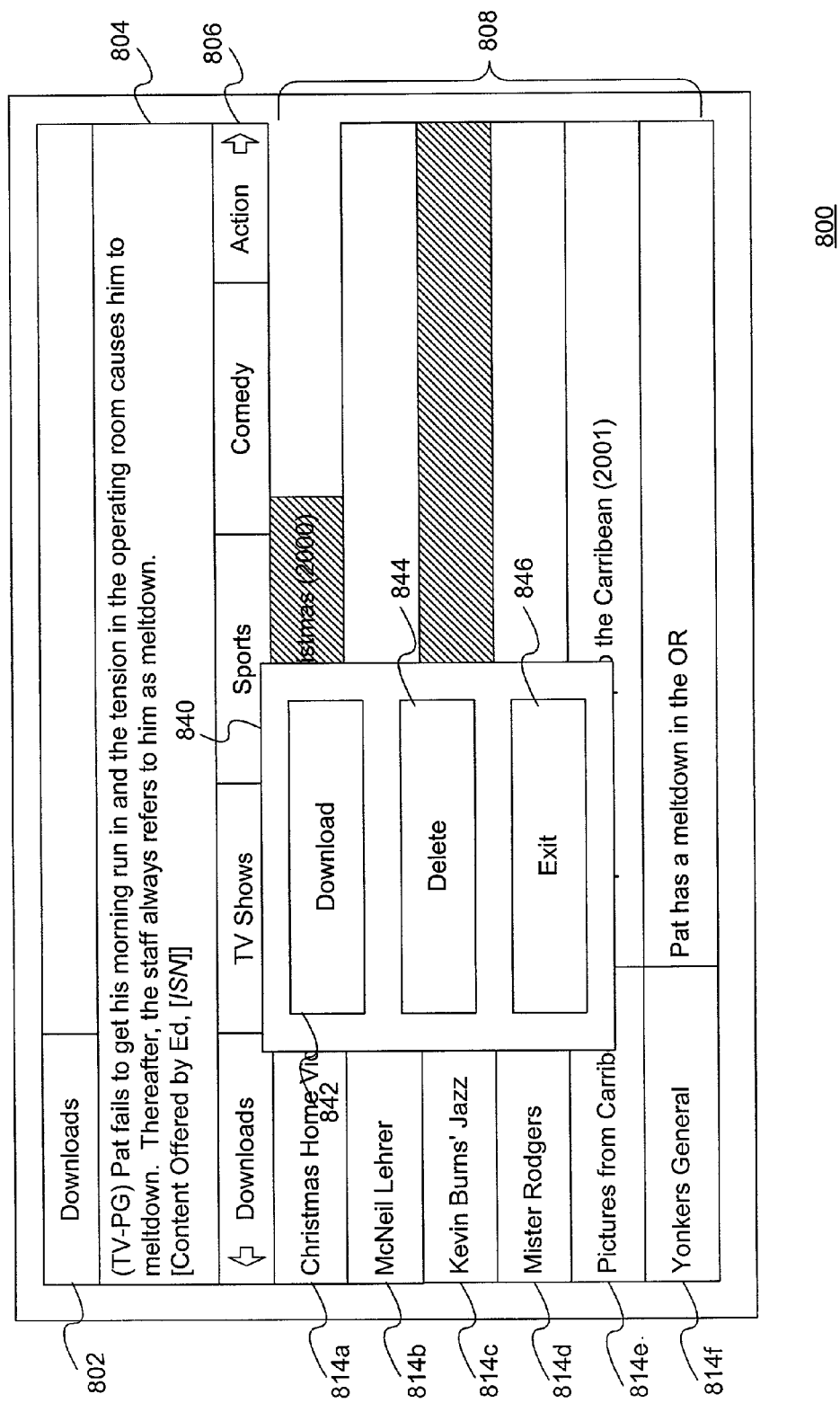

One embodiment of an updated content guide is now described, with reference to FIG. 8A. Generally, the playback guide display 800 shown therein is similar to the previously described playback guide display 700 (FIG. 7A), and includes analogous header 802, HUD 804, category 806 and content display 808 regions. However, included among the tabs 816a-e in the category region 806 is a "Downloads" tab 816a. When this tab is selected, as in FIG. 8A, one or more entries 814a-f are displayed. The entries correspond to content that has either been offered and downloaded, or that has been recently offered. The entries that have already been downloaded may be visually distinguished from those entries that have merely been offered, such as by showing the downloaded content in a different color. For example, the program corresponding to the entry 814c has been completely downloaded, and thus is shown in a visually distinguishing fashion. Additionally, partial downloads may be indicated visually, such as by filling a proportional portion of the entry with the "downloaded" color. An example shown in the figure corresponds to entry 814a.

As previously described, the HUD 804 illustrates additional information about a selected program, here the program for entry 814f. For the download tab 816a, the HUD 804 may not only describe the program, but may also indicate the sender of the program, as shown. ("Content offered by Ed, [ISN]). The user may navigate the playback guide display 800 as described previously. While in this mode, the user may easily navigate to a download screen if the entry has not yet been downloaded, through conventional remote control signals. For example, the relevant control could cause a pop up menu 840 illustrated in FIG. 8B to appear. This menu 840 includes "Download" 842, "Delete" 844, and "Exit" 846 buttons. Again, the functions on the pop up menu 840 would operate on the currently selected item in the guide. For example, if the cursor is navigated to the entry 814f for "Yonkers General," and then the pop up menu 840 is invoked, the selection from the pop up menu 840 will affect that program. An "Add sender to address book" button (not shown) could also be provided if the sender is not in the user's IAB. This button would prompt display of the previously described IAB displays to enter the new user.

Selecting download initiates a transfer of the content from the sending DVR to the receiving DVR, as previously described in connection with FIG. 5 above. Various alternatives can also be provided for displaying the downloading progress upon selection of the Download button 842. Preferably, the pop up menu will disappear upon selection and progress will be reflected in the playback guide display 800. In addition to illustrating the progress of a download, the HUD 804 may display download statistics such as rate (e.g. KB/second), progress (e.g. % downloaded), and estimated time remaining. Selection of a program being downloaded will prompt a different pop up menu (not shown) with buttons to "Cancel Download", "Play" and "Play from beginning." If the user selects "Cancel download", the download will be aborted, local mpeg and index files for the program will be deleted, and the program display will revert to its prior state. If the user subsequently selects "Download" the download will restart from the beginning.

Various alternatives may also be provided to account for the potential of a sender deleting a program before the receiving DVR has selected or completed a download. For example, if the user selects "Download" and the sender has already deleted the program, then the receiver will be notified that the program is no longer available for downloading. If the sender deletes a program when the download is in progress, the download will be canceled, and the user will be notified in the HUD for the program that the download was canceled because the sender deleted the program.

There are various alternatives to the above described and presently preferred embodiment, for communicating the availability of content between sending and receiving devices. For example, in lieu of piecemeal indications of the availability of content, a user may send messages for numerous pieces of content or even their entire content guide to potential recipients. There, the meta-data for all of the guide entries would be sent. The receiving device could variously display the guide, such as via a category or categories corresponding to the sending user, and the receiving user could then make selections of pieces of content, which would prompt downloading of the selected piece or pieces of content from the sending device to the receiving device as described above.

Furthermore, a "buddy list" system may be provided. This provides a list of known users, and typically also indicates which "buddies" are currently network connected. Conventional "buddy list" (and possibly instant messaging) technologies can be used along with the networked DVR and address information aspects of the present invention described above. A user's buddy lists can be updated and managed to allow a select set of other users to access a set of available content. For example, a first user can add a second user to his buddy list, which would allow the second user to remotely access the first user's content guide (e.g., Replay guide) from her DVR. Then, the second user could make selections from the first user's guide for "at will" downloading of pieces of content. In this embodiment, the first user could also filter or restrict downloads by theme, category or other criteria. Upon selection of a piece of content, the transfer mechanisms (and preferably the population of the local Replay guide) would also be as described above. There, of course, the selection of the content would precede the population of the guide with the corresponding entry.

Thus, embodiments for sending content between client devices have been described in accordance with the present invention. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for sharing content between digital video recorder (DVR) devices, the method comprising:

receiving digital broadcast stream media content and storing the digital broadcast stream media content on a first DVR device;

at the first DVR device, storing a unique identifier associated with a second DVR to indicate the second DVR device is enabled to send content to the first DVR device;

receiving a data transmission from the second DVR device, the data transmission comprising information describing digital media content available on the second DVR device;

generating a content guide on the first DVR device, the content guide listing digital media content stored on the first DVR device and digital media content available on the second DVR device as described by the information of the data transmission;

receiving at the first DVR device remote control commands that select at least one piece of the digital media content available on the second DVR device;

at the first DVR device, receiving the at least one piece of the digital media content available on the second DVR device; and wherein the content guide graphically distinguishes between digital media content that has been received from the second DVR device and digital media content that is available to be sent from the second DVR device.

2. The method of claim 1 wherein the at least one piece is transferred in a series of data blocks.

3. The method of claim 1 wherein the information describing the digital media content available on the second DVR device includes at least the titles of a plurality of digital media content.

4. The method of claim 1 wherein the unique identifier is an internet serial number (ISN) associated with the first DVR device, and the ISN associated with the first DVR device is stored on a server prior to the second DVR device transmitting a request to the server to obtain the stored ISN; and wherein the second DVR device locates the first DVR device using the ISN.

5. The method of claim 1 further comprising placing the first DVR device and second DVR device in a list indicating the first and second DVR devices are authorized to share content, the list being located on a server that is accessible by the second DVR device.

6. The method of claim 1 wherein the unique identifier is a media access control (MAC) address associated with the first DVR device, and further comprising:

storing, at a server, the MAC address information associated with the first DVR device; and locating the first DVR device based on MAC address information for the first DVR device obtained from the server.

7. The method of claim 1 wherein the content guide displayed on the first DVR device comprises at least a playback guide and a channel guide and the digital media content available on the second DVR device is listed in the playback guide on the first DVR device.

8. The method of claim 1 wherein the content guide displayed on the first DVR device provides a visual indication of digital media content received by the first DVR device from the second DVR device.

9. The method of claim 1 wherein receiving at least one piece of content comprises:

dividing the at least one piece of content into a plurality of blocks;

establishing a first connection to transmit a first set of the plurality of blocks from the second DVR device to the first DVR device;

in response to determining that the first connection is substantially interrupted, establishing a second connection to transmit a second set of the plurality of blocks from the second DVR device to the first DVR device to complete the transmission of the at least one piece of content; and communicating a data transmission from the first DVR device to the second DVR device indicating a successful transmission in response to the plurality of blocks associated with the at least on one piece of content being transmitted from the second DVR device to the first DVR device.

10. The method of claim 1 wherein the second DVR device communicates with a server to determine a logical port located on the first DVR device configured to receive a data transmission from the second DVR device.

11. The method of claim 1 wherein displaying a content guide is performed automatically by a common gateway interface (CGI) on the first DVR device.

12. The method of claim 1 wherein the at least one piece of digital media content is received at the first DVR by way of HTTP or FTP protocols.

13. The method of claim 1 wherein the second DVR device is identified by a custom name stored on the first DVR device prior to the second DVR device sending a data transmission to the first DVR device, and the custom name is displayed in a menu on the first DVR device.

14. The method of claim 1 wherein displaying a content guide on the first DVR device further comprises automatically updating the content guide to incorporate the information describing digital media content available on the second DVR device.

15. A system for sharing content between digital video recorder (DVR) devices, the system comprising:

a first DVR device having a tuner for receiving broadcast digital media content, a storage device for storing digital media content, a content transfer module for transmitting information describing available digital media content stored on the first DVR device and receiving information describing available digital media content stored on a second DVR device, a content guide module for displaying a content guide listing available digital media content stored on the first DVR device and available digital media content stored on the second DVR device;

an address management module on the first DVR device that stores a unique identifier of at least the second DVR device that is receiving digital media content prior to sending digital media content to the second DVR device; and a remote control device capable of communicating with the first DVR device to select at least one piece of the available digital media content stored on the first DVR device to transmit to the second DVR device; and wherein the content guide of the first DVR device is automatically updated to incorporate the information describing currently available digital media content stored on the second DVR device.

16. The system of claim 15 wherein the content transfer module of the first DVR device receives from the second DVR device a request to transfer the at least one piece of the available digital media content stored on the first DVR device.

17. The system of claim 15 wherein the updated content guide on the first DVR device provides a visual indication that the at least one piece of available digital media content stored on the first DVR device has already been transferred to the second DVR device.

18. The system of claim 15 wherein the first DVR device's address management module stores the unique identifier of at least the second DVR device, and other DVR devices that are allowed to receive digital media from the first DVR device.

19. The system of claim 15 wherein the unique identifier is a custom name uniquely associated with a DVR device, the address management module on the first DVR device stores at least the custom name of the second DVR device in order to locate the second DVR device to send digital media content.

20. The system of claim 15 wherein the content transfer module of the first DVR device transmits to the second DVR device a request to transfer the at least one piece of the available digital media content stored the second DVR device.

21. A method for sharing content between digital video recorder (DVR) devices, the method comprising:

receiving digital media content and storing the digital media content on a first DVR device;

receiving at the first DVR device remote control commands that select at least one piece of the digital media content stored on the first DVR device and select at least one recipient representing a second DVR device from a list of DVR devices that are stored on the first DVR device, wherein the list is generated prior to selecting digital media content to send to the second DVR device, and wherein, for each DVR device on the list, the list includes a DVR device ISN, MAC address, and custom name;

transmitting a data transmission from the first DVR device to the second DVR device, the data transmission comprising information describing the at least one piece of digital media content stored on the first DVR device;

receiving a request from the second DVR device at the first DVR device to initiate a transfer of at least one piece of the digital media content stored on the first DVR device; and transmitting the at least one piece of the digital media content to the second DVR device.

* * * * *